Dec. 30, 1941.　　　C. W. SINCLAIR　　　2,268,345
WHEEL
Filed June 12, 1939　　　2 Sheets-Sheet 1
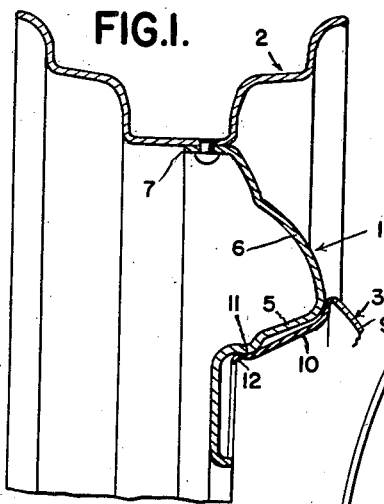
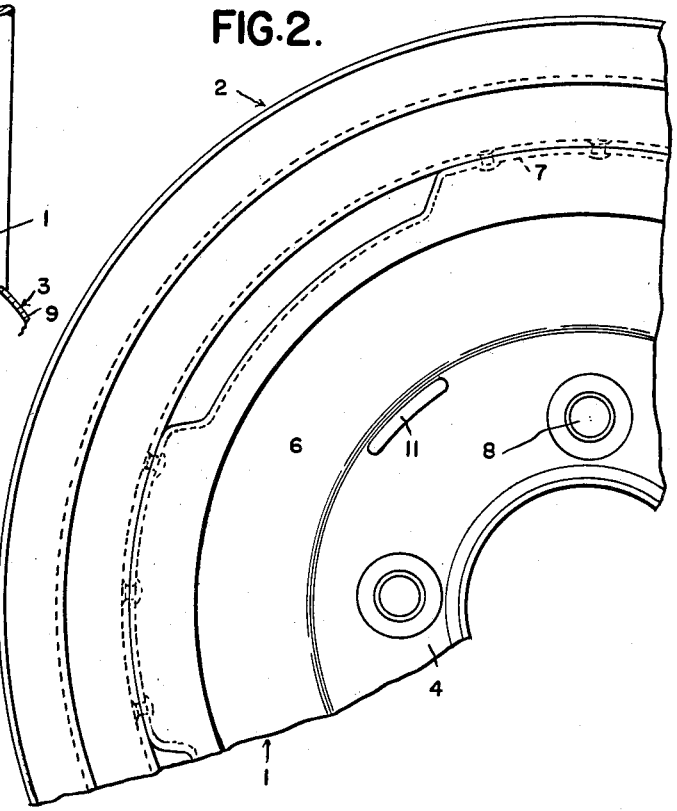
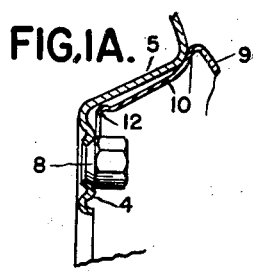
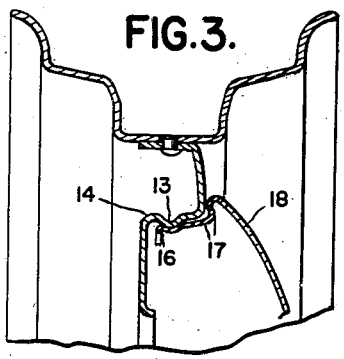
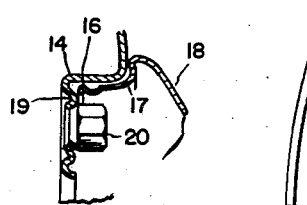
INVENTOR.
CHARLES W. SINCLAIR
BY
ATTORNEYS Dec. 30, 1941.    C. W. SINCLAIR    2,268,345
WHEEL
Filed June 12, 1939    2 Sheets-Sheet 2

INVENTOR.
CHARLES W. SINCLAIR
BY
ATTORNEYS

Patented Dec. 30, 1941

2,268,345

UNITED STATES PATENT OFFICE 2,268,345

WHEEL

Charles W. Sinclair, Detroit, Mich., assignor to Kelsey-Hayes Wheel Company, Detroit, Mich., a corporation of Delaware Application June 12, 1939, Serial No. 278,744

4 Claims. (Cl. 301—108)

The invention relates to wheels and refers more particularly to vehicle wheels constructed for the detachable mounting of hub caps thereon.

The invention has for an object to provide a wheel having hub cap retaining means interiorly of the wheel body and so arranged that relative movement of the hub cap and wheel body during flexure of the wheel body in operation is greatly reduced to thereby substantially eliminate hub cap noise.

The invention has for another object to provide a wheel having hub cap retaining means constructed to detachably hold the hub cap in position relative to the wheel body with the hub cap overlying and spaced from and independent of the body portion of the wheel body to eliminate hub cap noise.

The invention has for a further object to provide a wheel in which the wheel body is formed of pressed sheet metal and the means for mounting the hub cap is arranged and constructed to eliminate hub cap noise.

These and other objects of the invention will become apparent from the following description, taken in connection with the accompanying drawings, in which:

Figure 1 is a section through a wheel embodying my invention;

Figure 1A is a section through a portion of the wheel taken through the axis of one of the securing means;

Figure 2 is an outboard elevation of a portion of the wheel with the hub cap removed;

Figures 3, 3A and 4 are views similar to Figures 1, 1A and 2 respectively, illustrating a modified construction of wheel;

Figure 5:
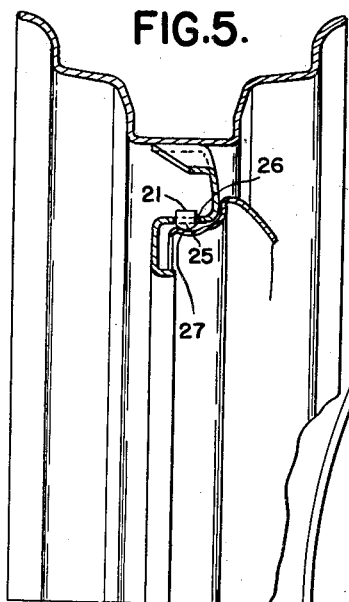
Figures 5 and 6 are views similar to Figures 1 and 2 respectively, illustrating another modification of wheel.

Referring to Figures 1 and 2, the vehicle wheel comprises the pressed sheet metal wheel body 1, the tire carrying rim 2 and the hub cap 3. The wheel body is formed with the generally radially extending bolting-on flange 4, the annular portion 5 extending generally axially in an outboard direction from the periphery of the bolting-on flange, and the body portion 6 extending generally radially outwardly from the outboard end of the annular portion. The body portion has the peripheral flange 7 to which the rim is secured. The rim, as shown, is of the drop-center type and the bottom of its well is seated upon the peripheral flange. The bolting-on flange is formed with the annular series of holes 8 for receiving the means, such as bolts and nuts, for securing the wheel to the hub.

The hub cap is formed of pressed sheet metal and has the body portion 9 which extends over the radially inner part of the body portion 6 of the wheel body. The hub cap also has the generally axially extending annular portion 10 projecting from the body portion 9 radially inside the annular portion 5. For the purpose of reducing the relative movement between the contacting faces of the hub cap and the body portion of the wheel body and at the same time providing a simple construction for securing the hub cap to the wheel body, the annular portion 5 is formed with the peripherally spaced radially inwardly extending bosses 11 located adjacent to the bolting-on flange. Also the annular portion 10 of the hub cap is formed near its free edge with the inclined part 12 for resiliently engaging the shoulders formed by the inboard sides of the bosses. The bosses 11 are arranged in as close proximity to the bolting-on flange as practical, bearing in mind both construction and assembly. In operation, the wheel body being resilient flexes to some extent in its body portion and about the outboard end of its annular portion and also about the periphery of its bolting-on flange.

Figures 3 and 4 illustrate another modification of wheel embodying the same principle for reducing squeak or other noise resulting from relative movement of the hub cap and body portion of the wheel body. It will be noted that the radially inwardly extending bosses 13 of the annular portion 14 of the wheel body are located as near the bolting-on flange of the wheel body as practicable, there being but very little clearance between the free end 16 of the annular portion 17 of the hub cap 18 and the stamped parts 19 of the bolting-on flange engaged by the securing nuts 20.

Figure 6:
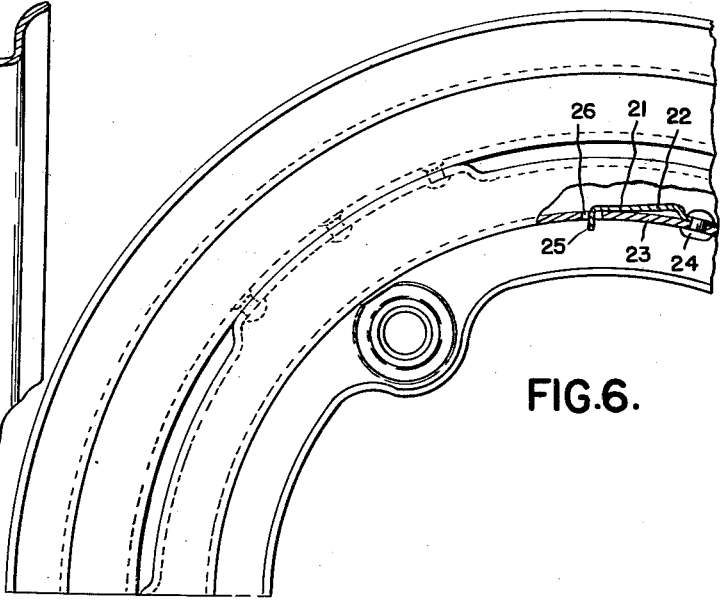

Figures 5 and 6 illustrate another modification in which the wheel body and the hub cap are formed in the same manner as the wheel body and hub cap of Figures 3 and 4, with the exception that the hub cap retaining means of the wheel body is different. This hub cap retaining means comprises the spring-urged detents 21, instead of bosses. Each detent, in the present instance, is formed in one piece and is resilient and has the resilient body portion 22 which extends peripherally around the radially outer side of the annular portion 23 of the wheel body. The body portion is fixedly secured at one end to the annular portion as by means of the rivet 24 and has at the other end the radially inwardly extending part 25 which projects through the hole 26 in the annular portion. The sides of the part 25 are rounded and the inboard side forms the retaining shoulder for engagement by the cooperating part 27 of the hub cap. If desired, the hub cap may be formed of some material which is not inherently resilient, since the resilient detents provide sufficient movement for the assembly and removal of the hub cap.

Figure 7:
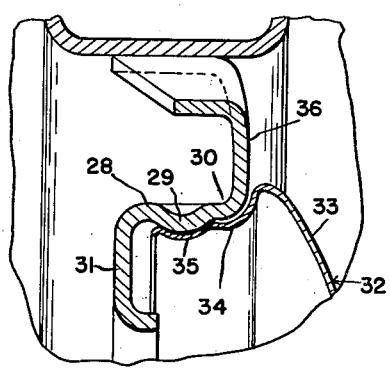
Figures 7, 8 and 9 are views similar to Figure 1 illustrating still other modifications of wheel.

Figure 7 illustrates another modification of wheel which eliminates hub cap noise or squeak. The wheel body 28 is the same as that illustrated in Figures 3 and 4, the radially extending bosses 29 formed in the annular portion 30 being located as near as practicable to the bolting-on flange 31. The hub cap 32 is formed of pressed sheet metal and has the body portion 33 and the generally axial annular portion 34. The latter is formed with the annular groove portion 35 near its free end for extending over the bosses 29 and resiliently engaging both the inboard and outboard sides or shoulders of these bosses. The axially outer part of the annular portion in the zone of its connection to the body portion 33 overlies and is spaced from and is independent of the body portion 36 of the wheel body. The construction is such that the hub cap may be resiliently engaged and secured to the wheel body and when applied the hub cap is held in predetermined concentric and axial relation to the wheel body by reason of the annular groove part of the hub cap engaging the inboard and outboard sides or shoulders of the bosses of the wheel body.

Figure 8:
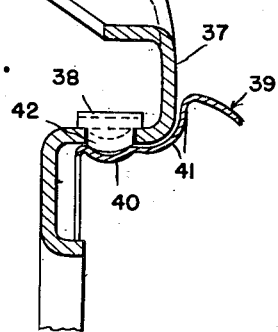

Figure 8 illustrates still another modification of wheel in which the wheel body 37 and its hub cap retaining means 38 are formed in the same manner as the wheel body and its hub cap retaining means illustrated in Figures 5 and 6. The hub cap 39 is the same as the hub cap 32 of Figure 7, with the possible exception that it need not be resilient since flexing of the retaining means 38 may be depended upon when the hub cap is being applied to or removed from the wheel body. It will be noted that in the construction illustrated in Figure 8 the annular groove portion 40 of the annular portion 41 of the hub cap extends over the inturned part 42 of the detent 38 and engages both the inboard and outboard sides or shoulders of this part so that the hub cap is concentrically and axially positioned relative to the wheel body and the axially outer part of the annular portion of the hub cap is held in spaced relation to the body portion of the wheel body.

Figure 9:
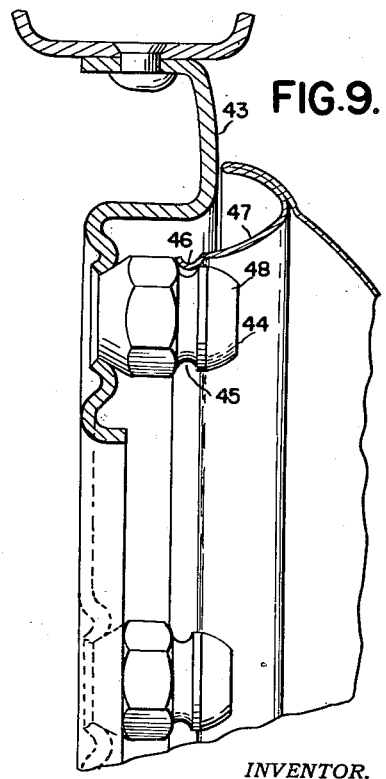

In the modification of wheel illustrated in Figure 9, the hub cap also overlies and is spaced from and is also independent of the body portion 43 of the wheel body. The hub cap, however, is secured in place by means of the annular series of nuts 44 which secure the wheel body to the hub. These nuts are formed near their outboard ends with the annular grooves 45 which present inboard and outboard sides or shoulders for engagement by the annular groove part 46 at the free end of the annular portion 47 of the hub cap. To facilitate applying the hub cap to the wheel body, the outboard end portions 48 of the nuts are beveled so that the groove parts 46 may ride radially outwardly thereover.

What I claim as my invention is:

1. In a wheel, a wheel body comprising a generally radially extending bolting-on flange, a generally axially extending portion projecting from said bolting-on flange and a generally radially extending body portion projecting from said generally axially extending portion, a hub cap having a body portion with a peripheral part overlying and of smaller diameter than said body portion of said wheel body and a generally axially extending portion connected to and supporting said hub cap body portion, and cooperating means on said generally axially extending portion of said hub cap and said wheel body radially within said generally radially extending body portion thereof for mounting said hub cap on said wheel body, said mounting means being spaced in an inboard direction from the outboard ends of said generally axially extending portions of said wheel body and hub cap and securing said hub cap in a predetermined position axially of said wheel body, the parts of said generally axially extending portions of said wheel body and hub cap on the outboard side of said mounting means being spaced from each other and said peripheral part of said hub cap being spaced from said body portion of said wheel body.

2. In a wheel, a wheel body comprising a generally radially extending bolting-on flange, a generally axially extending portion projecting from said bolting-on flange and a generally radially extending body portion projecting from said generally axially extending portion, a hub cap having a body portion with a peripheral part overlying and of smaller diameter than said body portion of said wheel body and a generally axially extending annular portion with an axially outer part connecting into the periphery of said hub cap body portion, and cooperating means on and spaced in an inboard direction from the outboard ends of said generally axially extending portions of said wheel body and hub cap for mounting said hub cap on said wheel body, the part of said generally axially extending portion of said hub cap on the outboard side of said mounting means and said peripheral part of said hub cap being spaced from the part of said generally axially extending portion of said wheel body on the outboard side of said mounting means and said body portion of said wheel body.

3. In a wheel, a wheel body comprising a generally radially extending bolting-on flange portion, a generally axially extending portion projecting from said bolting-on flange portion and a generally radially extending body portion projecting from said generally axially extending portion, a rim member on said body portion, a hub cap having a body portion with a part overlying said body portion of said wheel body and a generally axially extending portion extending within said generally axially extending portion of said wheel body and supporting said body portion of said hub cap, and cooperating means on said generally axially extending portion of said hub cap and said wheel body radially within said generally radially extending body portion thereof for mounting said hub cap on said wheel body, said mounting means being spaced in an inboard direction from said overlying part of said hub cap, the part of said hub cap on the outboard side of said mounting means being spaced from the part of said wheel body on the outboard side of said mounting means and also said rim member.

4. In a wheel, a wheel body comprising a generally radially extending bolting-on flange, a generally axially extending portion projecting from said bolting-on flange and a generally radially extending body portion projecting from said generally axially extending portion, a rim member secured to said body portion, a hub cap having a body portion with a part overlying said body portion of said wheel body and also having a generally axially extending portion connected to and supporting said hub cap body portion, peripherally spaced members upon said wheel body radially within said body portion of said wheel body and spaced in an inboard direction from the outboard end of said generally axially extending portion of said wheel body, said members being provided with inboard and outboard shoulders, and means upon said generally axially extending portion of said hub cap engageable with said inboard and outboard shoulders to secure said hub cap in predetermined radial and axial positions relative to said wheel body with said generally axially extending portions of said wheel body and hub cap on the outboard side of said members spaced from each other and said overlying part of said hub cap spaced from and independent of said body portion of said wheel body and said rim member.

CHARLES W. SINCLAIR.